(12) United States Patent
Song et al.

(10) Patent No.: US 8,692,918 B2
(45) Date of Patent: Apr. 8, 2014

(54) CMOS IMAGE SENSOR AND DRIVING METHOD THEREOF

(75) Inventors: Hyun-chul Song, Seoul (KR); Sang-sik Park, Seoul (KR); Won-hee Choe, Gyeongju-si (KR); Jae-hyun Kwon, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 914 days.

(21) Appl. No.: 12/292,691

(22) Filed: Nov. 24, 2008

(65) Prior Publication Data
US 2009/0244345 A1 Oct. 1, 2009

(30) Foreign Application Priority Data
Mar. 25, 2008 (KR) .................. 10-2008-0027381

(51) Int. Cl.
*H04N 3/14* (2006.01)
*H04N 5/335* (2011.01)

(52) U.S. Cl.
USPC ........................................ 348/308; 348/302

(58) Field of Classification Search
USPC ................................... 348/302–310
See application file for complete search history.

(56) References Cited

U.S. PATENT DOCUMENTS

| 7,091,531 | B2* | 8/2006 | Boemler | 257/222 |
| 7,719,590 | B2* | 5/2010 | Ellis-Monaghan et al. | 348/308 |
| 7,800,673 | B2* | 9/2010 | Sugawa et al. | 348/308 |
| 8,345,136 | B2* | 1/2013 | Song et al. | 348/308 |
| 8,471,940 | B2* | 6/2013 | Sa et al. | 348/308 |
| 2007/0132870 | A1* | 6/2007 | Ahn | 348/308 |
| 2008/0173909 | A1* | 7/2008 | Parks | 257/292 |
| 2009/0045319 | A1* | 2/2009 | Sugawa et al. | 250/208.1 |
| 2009/0141155 | A1* | 6/2009 | Ellis-Monaghan et al. | 348/308 |

FOREIGN PATENT DOCUMENTS

| JP | 2005-328493 | * 11/2005 |
| JP | 2006-245522 | * 9/2006 |

* cited by examiner

*Primary Examiner* — Timothy J Henn
*Assistant Examiner* — Pritham Prabhakher
(74) *Attorney, Agent, or Firm* — Staas & Halsey LLP (57) ABSTRACT

A CMOS image sensor is provided. The CMOS image sensor includes a photodiode receiving light and generating photocharges, a transfer transistor connected to the photodiode and transferring the photocharges, a floating diffusion accumulating the photocharges transferred from the transfer transistor, a reset transistor discharging the photocharges accumulated in the floating diffusion, and a merge gate transistor controlling capacitance of the floating diffusion. The CMOS image sensor may obtain a wide dynamic range signal without an increase in size of a pixel.

10 Claims, 6 Drawing Sheets

CMOS IMAGE SENSOR AND DRIVING METHOD THEREOF

CROSS-REFERENCE TO RELATED APPLICATIONS

This application claims priority from Korean Patent Application No. 10-2008-0027381 filed on Mar. 25, 2008, the disclosure of which is incorporated herein in its entirety by reference.

BACKGROUND

1. Field

The following description relates to a CMOS image sensor, and a CMOS image sensor capable of expanding a dynamic range, and a driving method thereof.

2. Description of the Related Art

Recently, equipments, such as a digital camera, a camera phone, a machine vision, a surveillance camera, etc., including a high-resolution camera, have been widely popularized. Such a high-resolution camera utilizes a Charged Coupled Device (CCD) or a CMOS image sensor as an image pickup device.

Since a conventional CMOS image sensor has a dynamic range of about 50-60 dB, there are limitations in generating images having a wide illumination range. For this reason, there occurs a case where a value of a bright part on a screen is saturated and the bright part appears white or a dark part on the screen is invisible. Also, due to miniaturization of equipments such as a digital camera or a camera phone, pixel size reduction and low power driving of an image sensor are required, but a sufficient dynamic range cannot be ensured through low voltage driving for satisfying such requirements.

SUMMARY

One or more embodiments of the present invention provide a CMOS image sensor capable of providing an expanded dynamic range without an increase in size of a pixel unit.

According to one or more embodiments, there is provided a CMOS image sensor including a photodiode receiving light and generating photocharges, a transfer transistor connected to the photodiode and transferring the photocharges, a floating diffusion accumulating the photocharges transferred from the transfer transistor, a reset transistor discharging the photocharges accumulated in the floating diffusion, and a merge gate transistor controlling capacitance of the floating diffusion.

According to one or more embodiments, there is provided a method of operating a CMOS image sensor, the CMOS image sensor to include a photodiode receiving light and generating photocharges, a transfer transistor connected to the photodiode and transferring the photocharges, a floating diffusion accumulating the photocharges transferred from the transfer transistor, a reset transistor discharging the photocharges accumulated in the floating diffusion, a merge gate transistor controlling capacitance of the floating diffusion, a source follower transistor amplifying and converting the photocharges accumulated in the floating diffusion to a voltage signal, and a selection transistor selectively outputting an output voltage, the method including reading a first reset voltage of the floating diffusion by turning on and off the reset transistor, when capacitance of the floating diffusion is expanded by turning on the merge gate transistor, reading a first signal voltage of the floating diffusion, generated by accumulation of photocharges overflowed to the floating diffusion from the photodiode in an integration time, reading a second reset voltage of the floating diffusion when the capacitance of the floating diffusion is reduced by turning on and off the reset transistor and then turning off the merge gate transistor, reading a second signal voltage of the floating diffusion, generated by transmitting the photocharges accumulated in the photodiode to the floating diffusion by turning on the transfer transistor, and generating a representation of a comparison of read voltages for generating an image.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Reference will now be made in detail to the embodiments, examples of which are illustrated in the accompanying drawings, wherein like reference numerals refer to the like elements throughout. The embodiments are described below to explain the present invention by referring to the figures.

Figure 1:
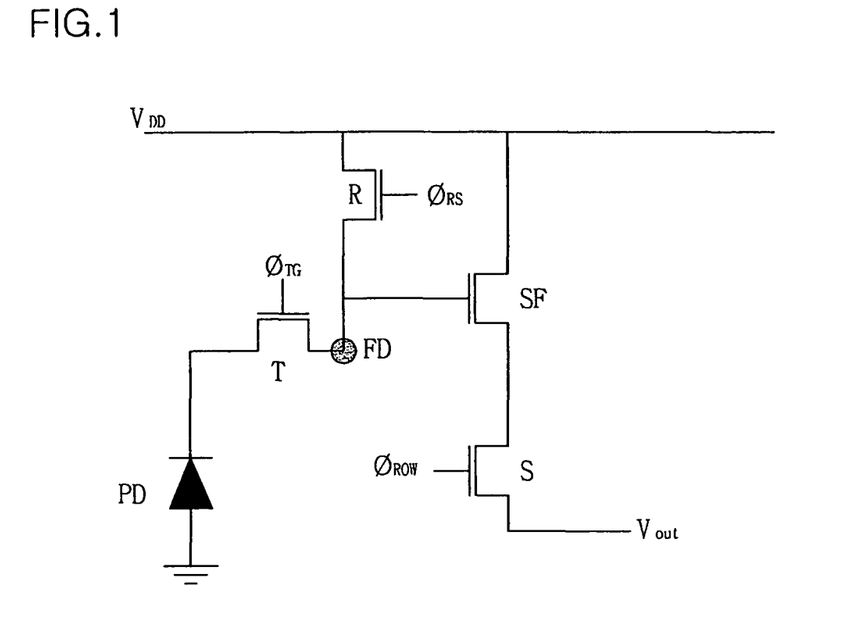
FIG. 1 is a circuit diagram of a CMOS image sensor according to a conventional technique.

FIG. 1 is a circuit diagram of a CMOS image sensor according to a conventional technique.

Referring to FIG. 1, a pixel of the CMOS image sensor includes a photodiode PD, a transfer transistor T, a source follower transistor SF, and a selection transistor S.

The photodiode PD receives incident light and generates photocharges. The transfer transistor T transfers the photocharges supplied by the photodiode PD to a floating diffusion FD. A reset transistor R is provided to reset the floating diffusion FD. The source follower transistor SF drives its source end in response to a voltage applied to the floating diffusion FD. The selection transistor S is connected to the source end of the source follower transistor SF, and selectively connects the source end of the source follower transistor SF to an output end.

The CMOS image sensor including the four transistors T, R, SF and S, as illustrated in FIG. 1, is characterized that a light receiving part (the photodiode PD) for receiving light is separated from a signal generating unit (the floating diffusion) for extracting signals from the received light.

The CMOS image sensor illustrated in FIG. 1 operates as follows.

In an integration time in which light is incident on the photodiode PD, the floating diffusion FD is reset by an operating voltage $V_{DD}$, so that the floating diffusion FD has a reset voltage $V_R$. Then, the reset voltage $V_R$ is read as an output voltage $V_{out}$. The reset voltage $V_R$ is varied whenever a reset operation is performed, due to reset noise caused by the reset operation.

Thereafter, the transfer transistor T is turned on to move photocharges accumulated in the photodiode PD to the floating diffusion FD. The photocharges pass through the source follower transistor SF and a signal voltage $V_{sig}$ is output as an output voltage $V_{out}$.

The difference between the reset voltage $V_R$ and the signal voltage $V_{sig}$ is used as a final signal. A reason why the difference between the reset voltage $V_R$ and the signal voltage $V_{sig}$ is used as a final signal is to remove reset noise, Fixed Pattern Noise (FPN), etc.

The dynamic range of the CMOS image sensor depends on the size of the light receiving part (that is the photodiode PD), the size of the floating diffusion FD, and the operating range of the source follower transistor SF. In order to increase the size of the floating diffusion FD, a high operating voltage or a great capacitance of the floating diffusion FD is needed. However, recently, portable devices, such as a cellular phone, a digital camera, etc., in which a battery is utilized, are manufactured to operate at a low operating voltage, and sensitivity is reduced as the capacitance of a floating diffusion FD increases. For these reasons, it is difficult to expand the dynamic range of such a CMOS image sensor.

Figure 2:
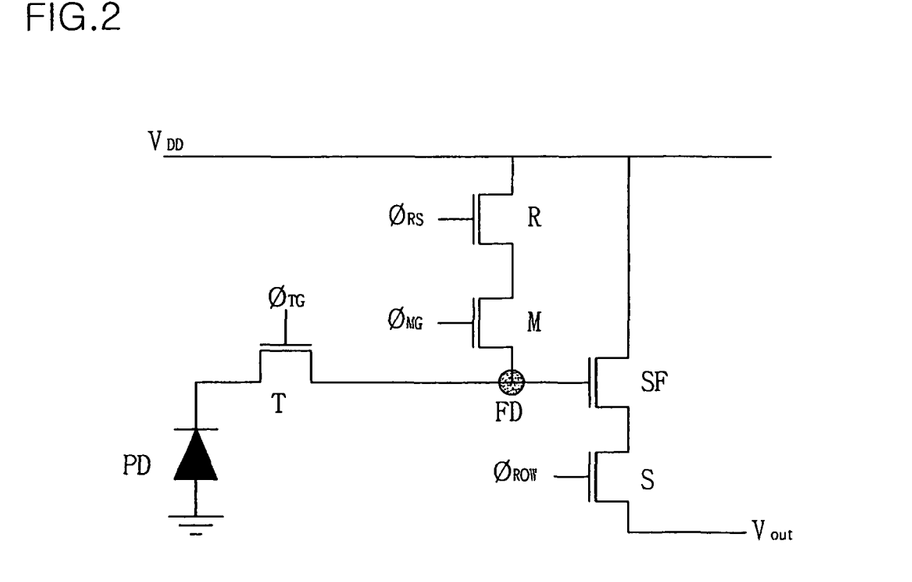
FIG. 2 is a circuit diagram of a CMOS image sensor according to an exemplary embodiment.

FIG. 2 is a circuit diagram of a CMOS image sensor according to an exemplary embodiment.

FIG. 2 shows a pixel of the CMOS image sensor. Referring to FIG. 2, the pixel of the CMOS image sensor includes a photodiode PD, a transfer transistor T, a reset transistor R, a merge gate transistor M, a source follower transistor SF, and a selection transistor S. The photodiode PD, the transfer transistor T, the reset transistor R, the source follower transistor SF, and the selection transistor S can perform the functions of the corresponding components included in the CMOS image sensor illustrated in FIG. 1.

The merge gate transistor M may be disposed between the reset transistor R and the floating diffusion PD.

The merge gate transistor M has a MOS capacitor structure and can confine more charges due to an increase of a potential well when an operating voltage $V_{DD}$ is applied to the gate of the merge gate transistor M. That is, by increasing the potential well (that is, a charge capacity) of the floating diffusion FD, the merge gate transistor M can confine more charges and accordingly a wide dynamic range signal can be obtained.

According to an exemplary embodiment, an image signal with an expanded dynamic range is obtained using signal voltages $V_{sig}$ of the floating diffusion FD obtained respectively when the merge gate transistor M is turned on and when the merge gate transistor M is turned off. Also, by reading each reset voltage $V_R$ with respect to each signal voltage $V_{sig}$ and obtaining respectively the difference between the signal voltage $V_{sig}$ and the reset voltage $V_R$, a correct final signal voltage can be obtained.

Now, a method of operating the CMOS image sensor will be described below with reference to FIG. 2.

First, in an integration time in which light is incident on a light receiving part, the merge gate transistor M is turned on, the floating diffusion FD is reset by the operating voltage $V_{DD}$, and a voltage of the floating diffusion FD is read as a first reset voltage. The reset voltage $V_R$ is varied whenever a reset operation is performed, due to reset noise caused by the reset operation.

In the integration time, photocharges generated by the photodiode PD overflow to the floating diffusion FD with expanded capacitance. A voltage generated by the photocharges overflowed to the floating diffusion FD is read by turning on the selection transistor S. The voltage is called a first signal voltage. A difference signal between the first signal voltage and the first reset voltage becomes a wide dynamic range, low-sensitivity image signal.

Then, the photocharges in the floating diffusion FD are discharged by turning on and off the reset transistor R, and a second reset voltage is read by turning off the merge gate transistor M. When the merge gate transistor M is turned off, the capacitance of the floating diffusion FD is reduced compared to the capacitance of the floating diffusion FD when the merge gate transistor M is turned on.

Then, by turning on the transfer transistor T, the photocharges remaining in the photodiode PD are transferred to the floating diffusion FD. The transferred photocharges are output through the source follower transistor SF. A voltage generated by the transferred photocharges is called a second signal voltage. A difference signal between the second signal voltage and the second reset voltage becomes a high-sensitivity image signal. This is because due to reduction of the capacitance of the floating diffusion FD when the merge gate transistor M is turned off, the same amount of photocharges generates a higher signal voltage than when the merge gate transistor M is turned on.

That is, by composing a high sensitivity signal with a low sensitivity signal, the dynamic range of the CMOS image sensor can be expanded.

Figure 3A:
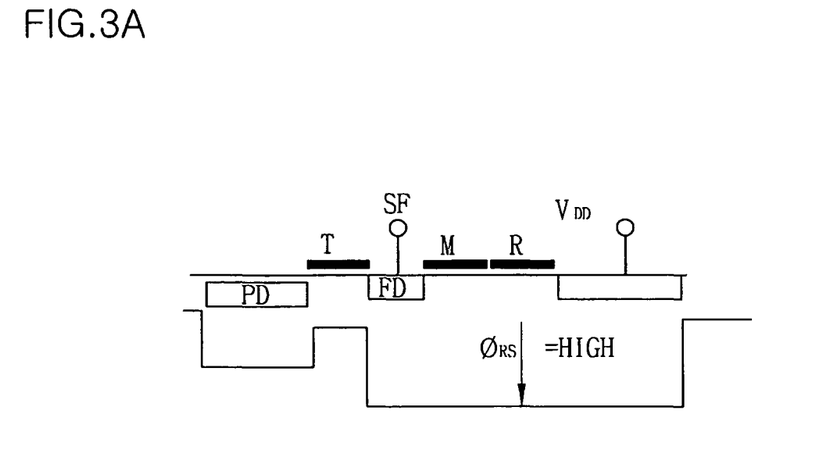
FIGS. 3A through 3F are views for explaining a potential distribution in the CMOS image sensor illustrated in FIG. 2.
Figure 3B:
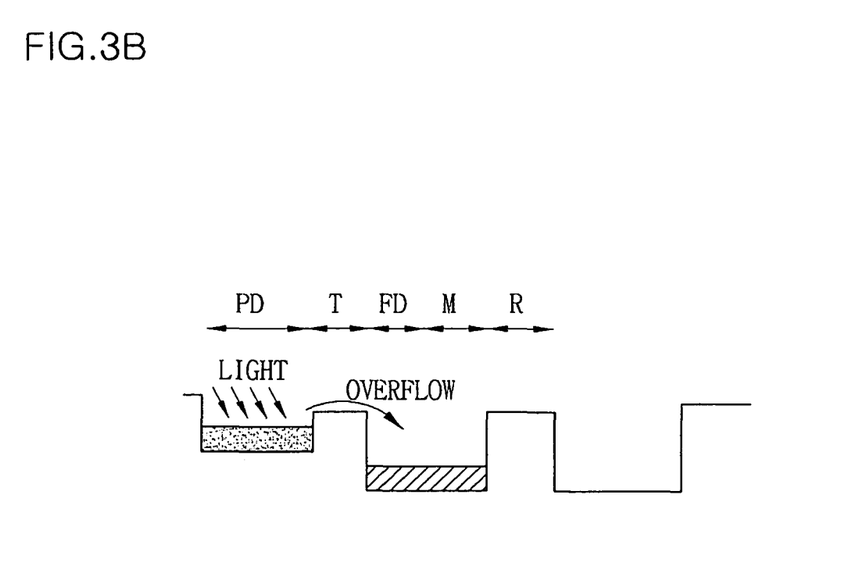
Figure 3C:
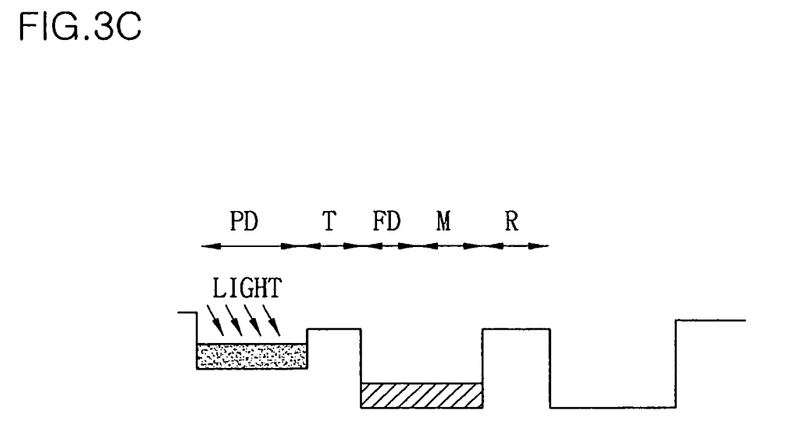
Figure 3D:
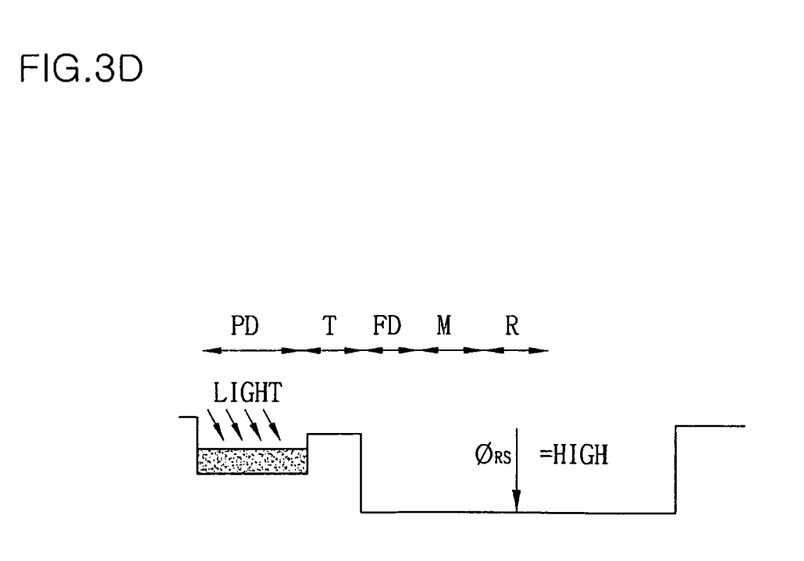
Figure 3E:
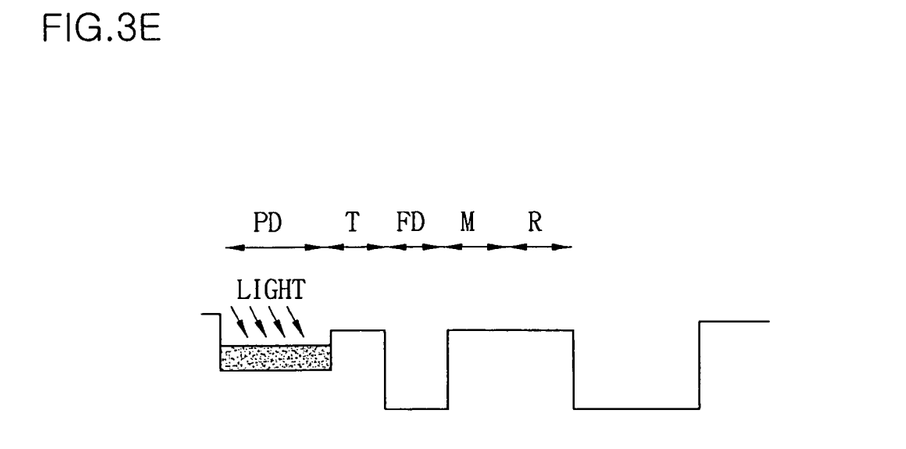
Figure 3F:
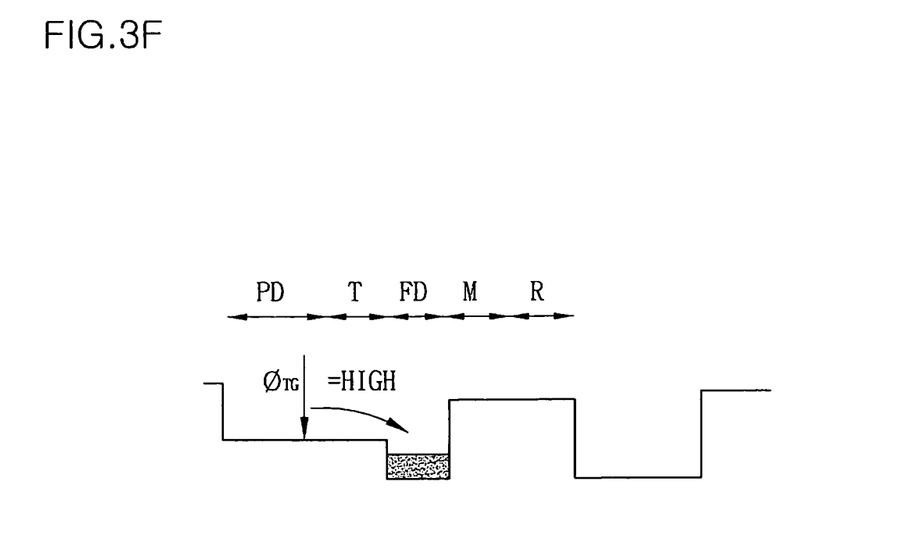
Figure 4:
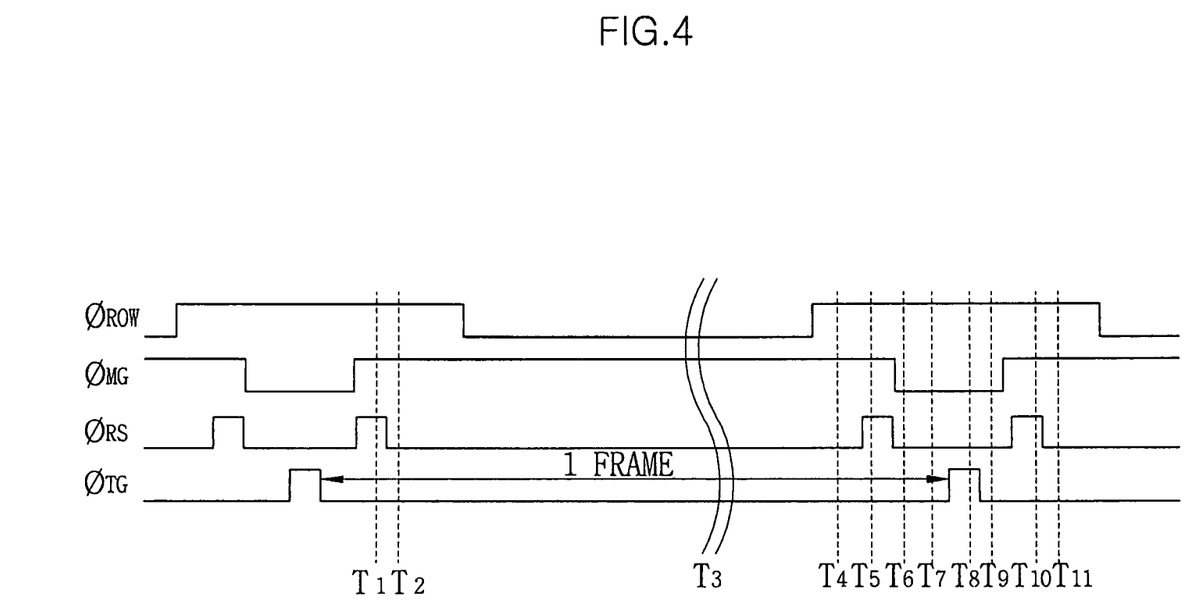
FIG. 4 is a view showing the operating timings of transistors included in the CMOS image sensor illustrated in FIG. 2.

FIGS. 3A through 3F are views for explaining a potential distribution in the CMOS image sensor illustrated in FIG. 2, and FIG. 4 is a view showing the operating timings of transistors included in the CMOS image sensor illustrated in FIG. 2.

Hereinafter, the operation of the CMOS image sensor illustrated in FIG. 2 will be described in detail with reference to FIGS. 3A through 3F and 4.

A potential distribution, as shown in the lower parts of a reference sign M in FIGS. 3A through 3F, represents a potential well of the floating diffusion (FD) region which is expanded or reduced when the merge gate transistor M is turned on or off. In FIG. 4, a time denoted by "1 frame" represents an integration time, that is, a light receiving time of the photo diode PD.

In order to detect an image using the CMOS image sensor, a gate input signal $\phi_{RS}$ of the reset transistor R goes "high" while a gate input signal $\phi_{MG}$ of the merge gate transistor M goes "high", as shown by times $T_1$ and $T_2$ in FIGS. 3A and 4.

When the gate input signal $\phi_{RS}$ of the reset transistor R is "high", photocharges remained before the floating diffusion FD are all discharged so that the floating diffusion FD is reset. Then, when the gate input signal $\phi_{RS}$ of the reset transistor R goes "low", a voltage of the floating diffusion FD is read as a first reset voltage.

FIG. 3B is a view for explaining an operation in which photocharges of the received light are accumulated from the photodiode PD to the capacitor of the expanded floating diffusion FD. In FIG. 4, in an integration time including a time $T_3$, photocharges are accumulated in the photodiode PD, and photocharges overflowed from the photodiode PD are accumulated in the capacitor of the expanded floating diffusion FD.

FIG. 3C shows a state where photocharges overflowed from the photodiode PD are accumulated in the capacitor of the expanded floating diffusion FD. Just ahead of a time $T_4$, the gate input signal $\phi_{ROW}$ of the selection transistor S goes "high", and a first signal voltage generated by the photocharges accumulated in the capacitance (that is, the capacitor of the expanded floating diffusion FD) of the floating diffusion FD and the merge gate transistor M, is read.

The first signal voltage is used as a low-sensitivity image signal. In detail, the difference between the first reset voltage and the first signal voltage is used as a wide dynamic range image signal.

FIG. 3D is a view for explaining the operation when the gate input signal $\phi_{RS}$ of the reset transistor R goes "high" in the state shown in FIG. 3C. Referring to FIGS. 3D and 4, at a time T5, the gate input signal $\phi_{RS}$ of the reset transistor R goes "high", so that the photocharges accumulated in the expanded floating diffusion FD are discharged.

Then, at a time $T_6$, the merge gate transistor M and reset transistor R are turned off, and a voltage of the floating diffusion FD is read as a second reset voltage.

FIG. 3E is a view for explaining a potential distribution when the merge gate transistor M is turned off. In times $T_6$ and $T_7$, the merge gate transistor M is turned off, so that the capacitance of the floating diffusion FD is reduced. Then, the integration time is terminated, and photocharges remaining in the photodiode PD after overflowing to the floating diffusion FD and the merge gate transistor M are maintained in the photodiode PD.

FIG. 3F is a view for explaining the operation when a gate input signal $\phi_{TG}$ of the transfer transistor T goes "high" and thus the photocharges remaining in the photodiode PD are transferred to the floating diffusion FD. If the charges remaining in the photodiode PD are transferred to the floating diffusion FD, the potential of the floating diffusion FD rises. At this time, a second signal voltage of the floating diffusion FD is read and used as a high-sensitivity signal.

Since the capacitance of the floating diffusion FD is reduced compared to the capacitance of the floating diffusion FD when the merge gate transistor M is turned on, the potential of the floating diffusion FD increases quickly for the same amount of charges, so that a high sensitivity signal is obtained. In detail, a difference between the second reset voltage and the second signal voltage is used as a high sensitivity image signal.

Figure 5:
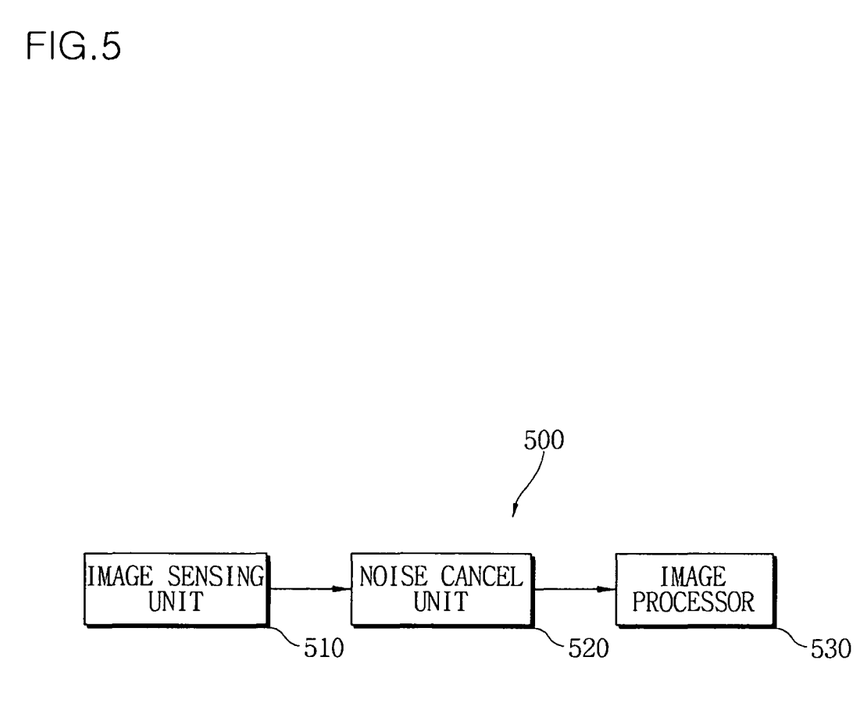
FIG. 5 is a block diagram of a CMOS image sensor according to another exemplary embodiment.

FIG. 5 is a block diagram of a CMOS image sensor 500 according to an exemplary embodiment.

Referring to FIG. 5, the CMOS image sensor 500 includes an image sensing unit 510, a noise cancel unit 520, and an image processor 530.

The image sensing unit 510 may be the CMOS image sensor illustrated in FIG. 2. The noise cancel unit 520 is used to remove noise caused by a reset operation.

That is, the noise cancel unit 520 obtains a first difference signal which corresponds to a difference between a first reset voltage of the floating diffusion FD and a first signal voltage of the floating diffusion FD, and outputting the first difference signal as a wide dynamic range signal. The first reset voltage of the floating diffusion FD is generated by turning on and off the reset transistor R while the merge gate transistor M is turned on, and the first signal voltage of the floating diffusion FD is generated by accumulation of photocharges overflowed to the expanded floating diffusion FD. Also, the noise cancel unit 520 obtains a second difference signal which corresponds to a difference between a second reset voltage of the floating diffusion FD and a second signal voltage of the floating diffusion FD, and outputs the second difference signal as a high-sensitivity signal. The second reset voltage of the floating diffusion FD is generated by turning on and off the reset transistor R after the first signal voltage is output, and the second signal voltage of the floating diffusion FD is generated by transferring photocharges remaining in the photodiode PD after overflowing, to the floating diffusion FD, by turning on the transfer transistor T when the merge gate transistor M is turned off.

The image processor 530 can generate a high-resolution, wide dynamic range, using the wide dynamic range signal and high-sensitivity signal received from the noise cancel unit 520.

According to an exemplary embodiment, a wide dynamic range signal can be obtained without an increase in size of a pixel by utilizing a circuit in which a merge gate transistor M is inserted between a reset transistor R and a floating diffusion FD. Also, since the capacitance of the floating diffusion FD of when the merge gate transistor M is turned off is used to obtain a high sensitivity signal, sensitivity does not deteriorate.

Accordingly, it is possible to provide a CMOS image sensor with an expanded dynamic range without any loss of sensitivity and an increase in size of a pixel.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A CMOS image sensor comprising:
   a photodiode configured to receive light and generate photocharges;
   a transfer transistor connected to the photodiode and configured to transfer the photocharges;
   a floating diffusion configured to accumulate the photocharges transferred from the transfer transistor;
   a reset transistor configured to discharge the photocharges accumulated in the floating diffusion; and
   a merge gate transistor configured to control capacitance of the floating diffusion,
   wherein the image sensor is configured such that the merge gate transistor is controlled to be switched, while photocharges are being accumulated within the CMOS image sensor for use in generating a high-resolution image, between being on and being off only once for obtaining the high-resolution image with an extended dynamic range.

2. The CMOS image sensor of claim 1, wherein the merge gate transistor is disposed between the reset transistor and the floating diffusion.

3. The CMOS image sensor of claim 1, further comprising:
   a source follower transistor amplifying and converting the photocharges accumulated in the floating diffusion to a voltage signal; and
   a selection transistor selectively outputting a corresponding output voltage.

4. A CMOS image sensor comprising:
   a photodiode configured to receive light and generate photocharges;
   a transfer transistor connected to the photodiode and configured to transfer the photocharges;
   a floating diffusion configured to accumulate the photocharges transferred from the transfer transistor;
   a reset transistor configured to discharge the photocharges accumulated in the floating diffusion; and
   a merge gate transistor configured to control capacitance of the floating diffusion,
   wherein the image sensor is configured such that the merge gate transistor is controlled to be switched between being on and being off only once for obtaining a high-resolution image with an extended dynamic range,
   wherein when the capacitance of the floating diffusion is expanded by turning on the merge gate transistor, photocharges overflowed from the photodiode during an integration time are accumulated in the floating diffusion.

5. The CMOS image sensor of claim 4, wherein when the capacitance of the floating diffusion is reduced by turning off the merge gate transistor, photocharges remaining in the photodiode after the overflowing to the floating diffusion are accumulated from the photodiode to the floating diffusion by turning on the transfer transistor.

6. A CMOS image sensor comprising:
a photodiode configured to receive light and generate photocharges;
a transfer transistor connected to the photodiode and configured to transfer the photocharges;
a floating diffusion configured to accumulate the photocharges transferred from the transfer transistor;
a reset transistor configured to discharge the photocharges accumulated in the floating diffusion;
a merge gate transistor configured to control capacitance of the floating diffusion,
wherein the image sensor is configured such that the merge gate transistor is controlled to be switched between being on and being off only once for obtaining a high-resolution image with an extended dynamic range;
a source follower transistor amplifying and converting the photocharges accumulated in the floating diffusion to a voltage signal;
a selection transistor selectively outputting a corresponding output voltage; and
a noise cancel unit removing noise caused by a reset operation,
wherein when the merge gate transistor is turned on, the noise cancel unit outputs a first difference signal which is a difference between a first reset voltage of the floating diffusion, generated by turning on and off the reset transistor, and a first signal voltage of the floating diffusion, generated by accumulation of photocharges overflowed from the photodiode to the floating diffusion, and
after the first signal voltage is output, the noise cancel unit outputs a second difference signal which is a difference between a second reset voltage of the floating diffusion, generated by turning on and off the reset transistor, and a second signal voltage of the floating diffusion, generated by transmitting to the floating diffusion photocharges accumulated in the photodiode by turning on the transfer transistor when the merge gate transistor is turned off.

7. The CMOS image sensor of claim 6, further comprising an image processor generating the high-resolution image with the expanded dynamic range using the first difference signal and the second difference signal.

8. A method of operating a CMOS image sensor, the CMOS image sensor to include a photodiode configured to receive light and generate photocharges, a transfer transistor connected to the photodiode and configured to transfer the photocharges, a floating diffusion configured to accumulate the photocharges transferred from the transfer transistor, a reset transistor configured to discharge the photocharges accumulated in the floating diffusion, a merge gate transistor configured to control capacitance of the floating diffusion, a source follower transistor configured to amplify and convert the photocharges accumulated in the floating diffusion to a voltage signal, and a selection transistor configured to selectively output an output voltage, the method comprising:
reading a first reset voltage of the floating diffusion by turning on and off the reset transistor, when capacitance of the floating diffusion is expanded by turning on the merge gate transistor;
reading a first signal voltage of the floating diffusion, generated by accumulation of photocharges overflowed to the floating diffusion from the photodiode in an integration time;
reading a second reset voltage of the floating diffusion when the capacitance of the floating diffusion is reduced by turning on and off the reset transistor and then turning off the merge gate transistor;
reading a second signal voltage of the floating diffusion, generated by transmitting additional photocharges accumulated in the photodiode to the floating diffusion by turning on the transfer transistor; and
generating a representation of comparisons of the read voltages for generating an image.

9. The method of claim 8, further comprising:
outputting a first difference signal between the first reset voltage and the first signal voltage; and
outputting a second difference signal between the second reset voltage and the second signal voltage.

10. The method of claim 9, further comprising:
generating a high-resolution image with an expanded dynamic range using the first difference signal and the second difference signal.

* * * * *